United States Patent [19]

Michelsen

[11] 3,981,010

[45] Sept. 14, 1976

[54] OBJECT LOCATING SYSTEM

[75] Inventor: Paul F. Michelsen, Kensington, Md.

[73] Assignee: RMC Research Corporation, Bethesda, Md.

[22] Filed: Mar. 22, 1974

[21] Appl. No.: 453,973

Related U.S. Application Data

[62] Division of Ser. No. 268,632, July 3, 1972, Pat. No. 3,798,795.

[52] U.S. Cl. ............... 343/6 TV; 178/DIG. 21; 343/12 R
[51] Int. Cl.² ............................................. G01S 9/04
[58] Field of Search............. 343/6 ND, 6 TV, 12 R; 178/DIG. 21

[56] References Cited
UNITED STATES PATENTS

| | | | |
|---|---|---|---|
| 3,053,932 | 9/1962 | Worst................. | 343/6 ND |
| 3,108,270 | 10/1963 | Fairbanks............. | 343/6 ND |
| 3,168,735 | 2/1965 | Cartwright............ | 343/12 R |
| 3,333,264 | 7/1967 | Knepper............... | 343/12 R |
| 3,754,249 | 8/1973 | Kearney............... | 343/6 TV X |
| 3,829,614 | 8/1974 | Ahlbom et al......... | 178/DIG. 21 X |
| 3,836,259 | 9/1974 | Partridge............. | 178/DIG. 21 X |
| 3,854,133 | 12/1974 | Cabion................ | 343/12 R |

Primary Examiner—T.H. Tubbesing
Attorney, Agent, or Firm—Revere B. Gurley

[57] ABSTRACT

This system observes and registers the instantaneous position of a moving, distant object. A television camera receives an image on its sensitive surface, and direction of the object is registered continuously in a data processing unit. The range of the object is measured by transmitting two spaced, high frequency radiations to the object, on which is mounted a radio frequency transmitter to be actuated by the transmitted radiations, to transmit return radiations, which are compared with the original transmissions to measure the distance of the object and register the distance in the data processing unit. The data processing unit registers the direction and distance of the object.

15 Claims, 5 Drawing Figures

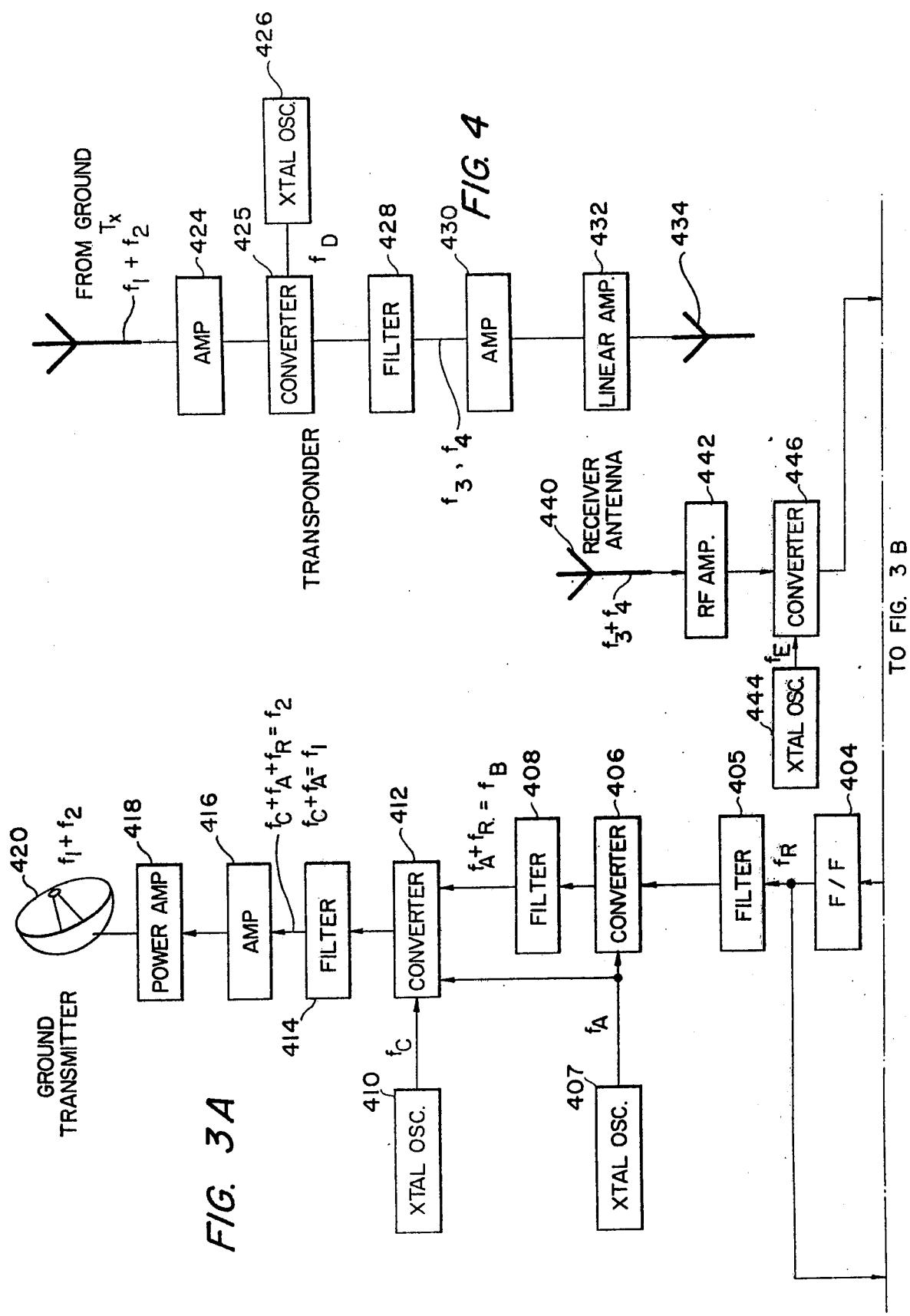

OBJECT LOCATING SYSTEM

This application is a division of Ser. No. 268,632, filed July 3, 1972, patented March 26, 1974, as U.S. Pat. No. 3,798,975, which may be referred to for description of the complete system claimed therein, and of the Elevation Angle Measurement and Azimuth Angle Measurement, as indicated diagrammatically in FIG. 1.

This invention relates to a system for locating the instantaneous position of a distant object, and is a component of a more complex system for evaluating the accuracy of aim of a weapon directed at the object. The primary system is described to explain operation of the secondary system which operates to locate the object at any given instant.

The entire Weapon Aim Evaluation System includes a weapon such as a gun designed to be aimed at a target, and a target such as an airplane carrying a light and a radio transmitter which is actuated by a radio receiver. Angle measuring mechanisms measure the elevation and azimuth of the gun and the Object Locating System gives the position of the target. A data processing unit receives and registers the data from the system and computes the results.

The Object Locating System of this invention consists of a television camera connected to determine the direction of the light on the target and the radio ranging system, both of which are connected to the DPU to register the direction and distance of the target.

The essential components of the system and their operation are:

1. The Weapon System with Angle Measurement

The weapon itself, in the case illustrated an anti-aircraft gun which has associated with it components for its line-of-aim measurement, in this case elevation angle measurement and azimuth angle measurement systems. The azimuth angle measurement system includes a Ground Point Location element so that the azimuth angle is measured in a coordinate system oriented to the gun and yet is independent of changes in the gun position. The data from these systems is supplied to the Data Processing Unit.

The object of the system used for elevation angle measurement is to measure the angular position relative to a zero position of an angularly movable member at frequent small time intervals and to register such angular measurement at any particular time.

The object of the system used for azimuth angle measurement is to measure the angular position of an angularly movable member relative to a fixed line or base line at frequent small time intervals, and to register such angular measurement at any particular time. This measurement is carried out with reference to a point external to the motion system of the movable member.

The elevation angle measurement and azimuth angle measurement systems are complete angle measuring systems in themselves and have general utility in measuring angular position. In both systems, electrical pulses are produced by a rapidly spinning body and input to a counter. The counting of pulses is controlled by the relative angular position of the gun to its mount in the elevation angle measurement and relative to a ground point position spaced from the gun in the azimuth angle measurement.

2. The Television Camera Direction System

A television camera which follows the target provides for line-of-sight measurement of the target, by an elevation angle measurement and an azimuth angle measurement. The television camera has an electronic system which cooperates with a signal unit, a light on the target, and provides an accurate measurement of the line-of-sight for data to be supplied to the DPU to be utilized in calculating the target position.

The object of the television camera direction system is to register the direction of an object which produces an image on the sensitive surface of the camera. The source of the image is a light, and the coordinates of the image on the surface with the directional angles of the camera tube are combined to provide an accurate measurement of the angles of the line-of-sight to the light.

3. The Distance Measurement System

The distance or range measurement system, which measures the distance of the target constantly, and provides this data to the DPU. This system includes the transmitter, a transponder on the aircraft for transmitting a return signal, a receiver to receive the return signal, and phase measuring circuits to derive distance data for the DPU. The ground unit, or the transmitter, is mounted to move with the television camera, so that the unit or its transmitter is directed toward the target. These two devices may be mounted on the same base for conjoint movement.

The object of this system is to measure a distant object by high frequency radiations without ambiguity inherent in direct measurement by high frequency radiations. This system employs radiations spaced by a low frequency with a wave length comparable to the range of the system, utilizing the phase displacement of the low frequency to provide the measurement.

THE DRAWINGS

FIGS. 3A and 3B are a composite block diagram of the ground radio apparatus.

FIG. 4 is a block diagram of the radio apparatus on the target.

SYSTEM OPERATION

Figure 1:
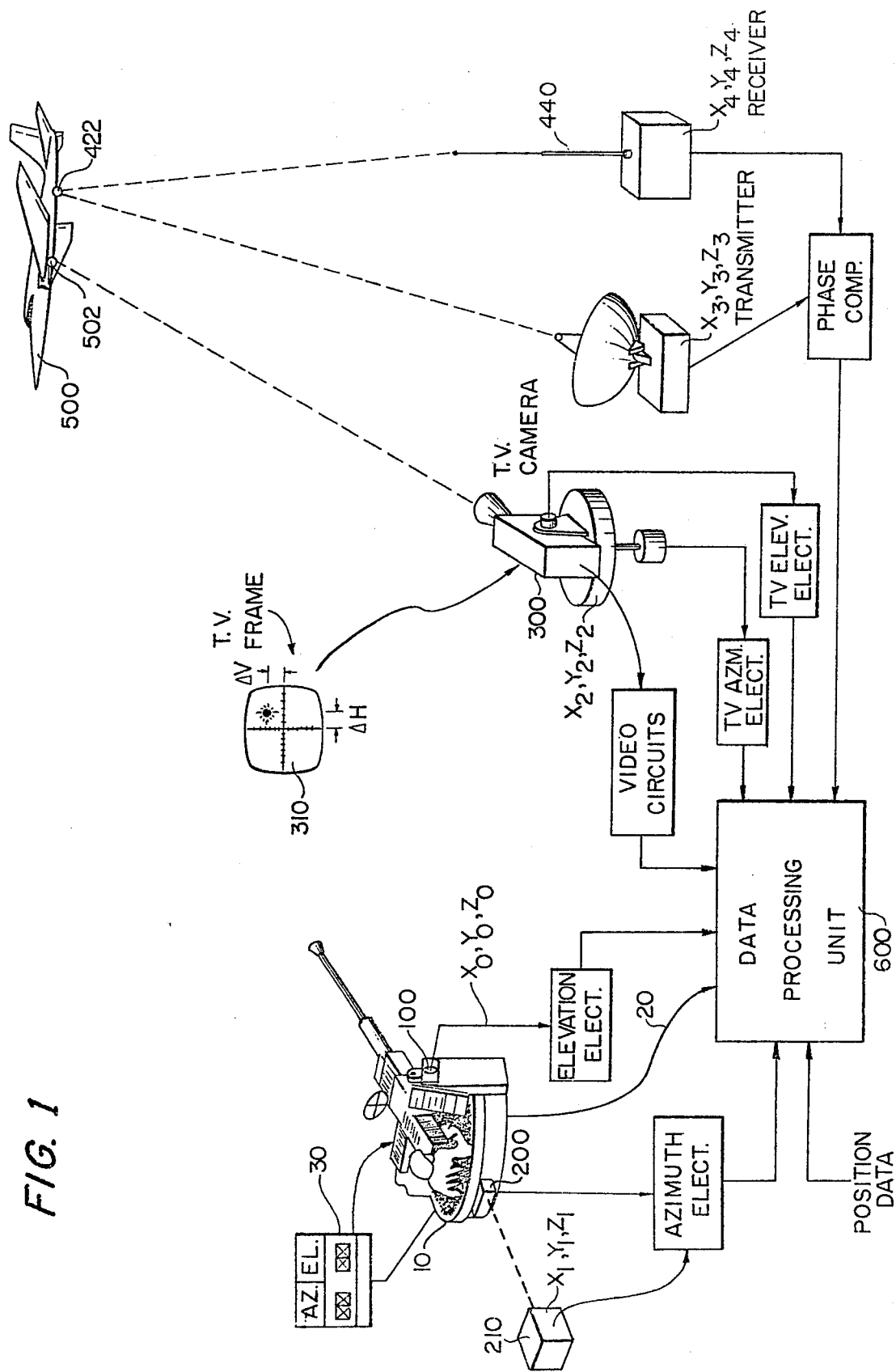
FIG. 1 is a diagrammatic view of the entire system.
Figure 2:
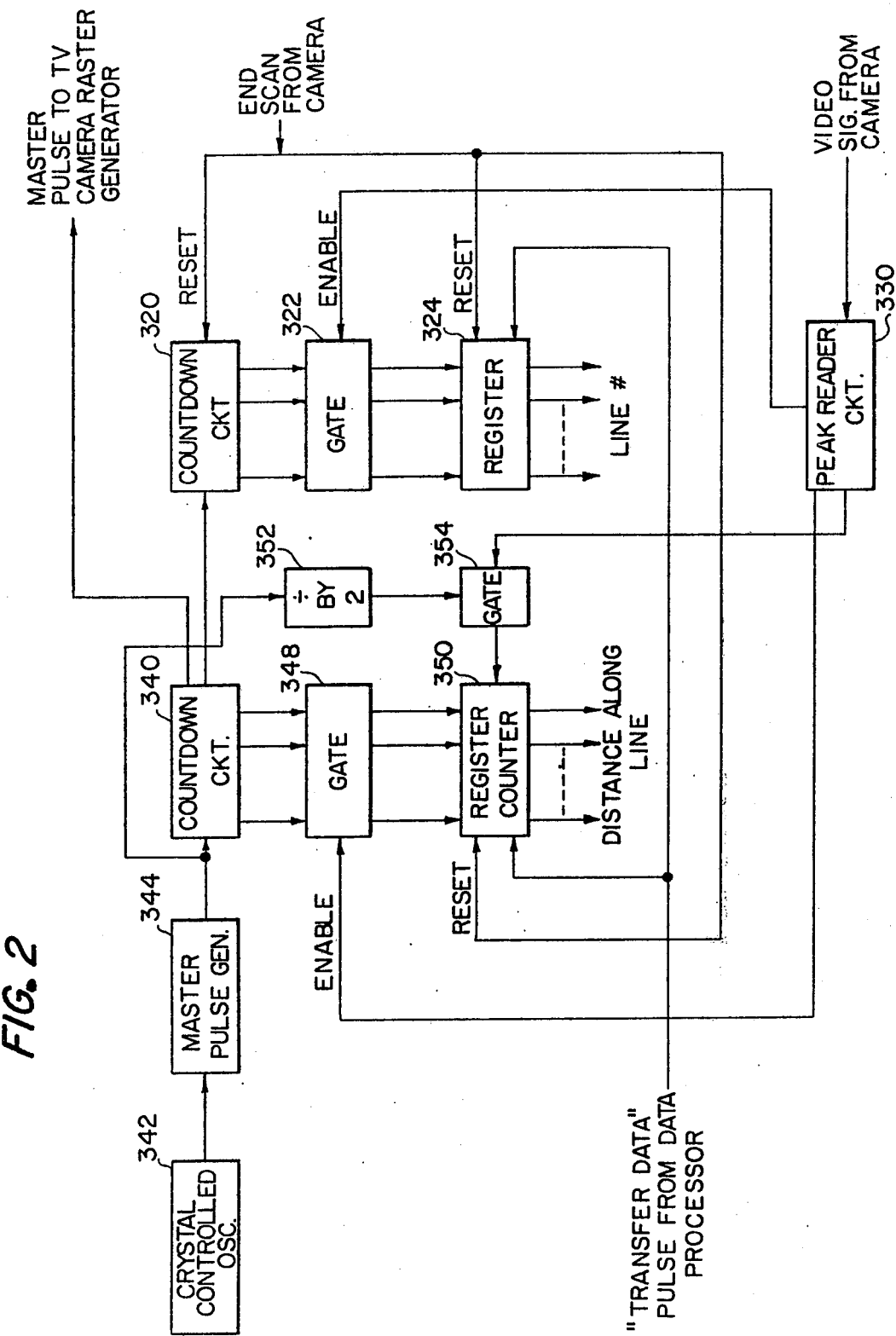
FIG. 2 shows the electronic circuit which provides the values of the coordinates of the image on the frame of the television camera.

The missile-firing weapon, or anti-aircraft gun 10, is placed at a point $x_0$, $y_0$, $z_0$ in a common coordinate system. The elevation angle measurement 100 provides the data of the elevation angle of the gun as it is moved by the gunner, and the azimuth angle measurement system 200 provides the data for the azimuth angle. A ground point location unit 210 at a point $x_1$, $y_1$, $z_1$ in the common coordinate system is used as a reference position for measurement system 200 of the azimuth angle. The elevation and angle measurement systems transmit pulses which represent the values of the angles to electronic averaging and multiplier units.

The TV camera 300 at position $x_2$, $y_2$, $z_2$ in the common coordinate system may be manually moved to follow the target or could be moved automatically. In addition to devices for measurement of the elevation and azimuth angles of its line-of-signt, the camera is provided with an electronic scanning measuring system for registering the position of a signal light 502 carried by the aircraft target 500. The elevation and azimuth angle measuring systems and the electronic video signal measuring system transmit data of the values of these measurements to the Data Processing Unit (DPU) 600. With the data from these systems, the DPU can make an accurate calculation of the position of the target.

The range or distance measurement system 400, with the ground unit transmitter at $v_3$, $y_3$, $z_3$, also includes the transponder 422 on the aircraft target 500, which relays the return signals to the ground receiver at $x_4$, $y_4$, $z_4$. This system, transmitting in high radio frequencies, uses a narrow band and measures the distance unambiguously with standard circuitry to the necessary accuracy for this purpose.

Operation of the firing mechanism of weapon 10 activates the DPU through lead 20 initiating the calculations from the data input of the weapon, TV camera, and range measurement systems. The DPU calculates the path of a conventional projectile and compares it to the flight of the target aircraft either as actually flown by the target or as predicted by, for example, a least squares curve fitting calculation. The DPU may then exhibit at 30 the score of hit or miss as well as the errors in elevation and azimuth angles.

TELEVISION CAMERA TARGET TRACKER

The television camera is used to track the target and with associated elements and electronics provide a measure of the angular position of the target. The elevation and azimuth angles are used to register the line-of-sight of the camera and the data of these angles and the location of the target within the camera's field-of-view is fed to an electronic unit for the determination of the exact angular position of the target.

In the present system the target aircraft carries a signal light which gives substantially a point image on the TV frame. The TV camera subtends a substantial angle while the image of the target may occupy only a small spot somewhere on the frame of the TV camera. Therefore, the line-of-sight will, in general, give only a coarse and unreliable measure of the angular location of the target. A more accurate measure of the angular location of the target is necessary for accurate evaluation of the gunnery operation. For this purpose, the position of the image is located on the frame in the camera, and this position is related to the direction of the camera axis or line-of-sight. This light may be infrared, to avoid confusion of the gunner, and can be obtained by filtering broad band light to shut out visible light. The position of the point light on the TV frame is measured by the scanning trace of the TV camera, and the data from the trace is then inputted to the electronic unit to modify the camera direction data and give the true line-of-sight of the target.

The television camera 300 is mounted for movement in all directions, i.e., the elevation angle and azimuth angle, being measured by angle measuring apparatus similar to the elevation angle measuring device on the gun. The camera is moved to keep the target airplane 500 in its line-of-sight, the light 502 on the plane forming an image on the sensitive surface 310 of the TV camera. In general, the image on the television frame will be spaced from the center axis, or the boresight, of the camera, and the position is located in the frame to give an accurate measure of the image location with respect to the boresight. The television frame under American standards is scanned 525 lines per frame 30 times a second to produce a picture signal but other scanning patterns may be used. The position of the image of the light in the frame can be measured by registering the line which intersects the image and the length of the line from the start of the line to the position of the image.

The size of the image of the signal light on the image surface of the TV tube should be at least as large as the width of two or three lines (or on the order of 3/1,000 of an inch for a TV camera tube with a ½ × ⅜ inch active area. With a small light that is necessary on the target, a sharply focused image may produce almost a true point which is not large enough to insure registering on the image surface with the scanning trace. The spot of the light may be made larger by displacing the image surface to either side of the in-focus plane of the lens, i.e., by displacing from the in-focus point of the lens, to increase the point image on the image surface to spot sufficiently large for registering by the scanning trace.

Recognition of the light signal on the tube's sensitive surface is made on the basis of the highest level of the video signal during a scan of the electron beam. The circuit for recognizing this peak level and registering its position is shown in FIG. 11. For this purpose, the light must be intense enough to form an image of greater brightness than its background and, as described, large enough to be intersected by several lines. Infrared light has been found to be preferable as it is invisible to the gunner and penetrates moisture or haze better than light in other portions of the spectrum.

The start of the scan initiates the counter 320, which then counts the line traces until the end of the scan, when it is reset. The video signal has an input to a peak reader circuit 330 which, on receiving a peak video signal higher than preceding signals from the camera, enables gate 322 to pass the count from counter 320 to a register 324 which thereby registers the number of the line in which that peak occurred.

At the start of the scan, the peak reader will cause the first line number to be transferred as any video signal of a line trace signal will be greater than zero. A video signal of a higher level than that of the first line will then cause the transfer of the number of that line to register 324 replacing the previous number. No transfer signal occurs when the signal level of a line's video signal is not higher than the previous high level, so that at the end of the scan, the number of the line with the highest signal level, or greatest light intensity, is stored in register 324, to give one coordinate of the light image on the frame of the TV tube.

The other coordinate is obtained by measuring the point on the line that the peak signal occurred. This measure is made in a counter 340 by registering a series of pulses from the start of the line; the number of pulses, N, being determined by the resolution required.

In the example shown, a crystal controlled oscillator 342 and the pulse generator 344 operate at a frequency of 3,91625 MHZ to transmit $3.91625 \times 10^6$ PPS to the countdown circuit 340, which reduces the pulse rate by dividing by 256 to give $15.75 \times 10^3$ PPS which provides the master pulse to the TV camera raster generator. These pulses also supply the countdown circuit 320.

The gate 348 passes the count in counter 340 to the register 350 under control of a signal from the peak reader circuit in the same manner as for the line counter, so that the register contains the number of pulses from the beginning of a line, which indicate the position on the line that a peak level intensity occurs.

As the image of the light can be wider than the equivalency of 1 count distance along a line, the signal from the peak reader to the gate causes, first, the count in the countdown circuitry unit that exists at the beginning of the new high peak signal to be transferred to the register counter 350 via a gate 348, then increases the count in the register one count for each two counts inputted to the countdown circuitry unit through division circuit 352 and gate 354. After the passage of the "high", the register 350 will have a count which is related to the center of the "high" signal, and higher accuracy results.

The operation of the gun at the proper time will cause the data processing unit to read out the registers 324 and 350 into the DPU, giving the counts corresponding to the coordinates of the peak level signal on the image surface of the television camera frame 310, under control of a transfer data pulse from the DPU. The DPU then calculates the true line-of-sight of the light beacon on the target.

Following the scan of each frame 310 of the television camera, an end scan signal from the camera rests the counter 320 and registers 324 and 350 for the next scan.

RANGE MEASUREMENT SYSTEM

The range measurement system used is of general application for measuring the distance between two points. The basis for measurement is the phase displacement of a long wave radiation signal which has a length as great as the distance to be traversed from one point to the other and return, so that the ambiguity of a phase displacement of more than 360° is avoided. By this invention, the same result is obtained by transmitting two continuous wave radiations $f_1$ and $f_2$, differing by the low frequency $f_R$ ($f_R=f_2-f_1$) and subsequently measuring the phase displacement of the low frequency $f_R$ at the receiver. The two transmission frequencies may be produced by adding the low frequency $f_R$ to a higher frequency $f_A$, the two frequencies $f_A$ and $f_A+f_R$ then being combined with a high frequency $f_C$. The two frequencies $f_1$ and $f_2$ ($f_1=f_A+f_C$ and $f_2=f_A+f_C+f_R\times f_1+f_R$) may then be transmitted as two continuous wave radiations.

Figure 3B:
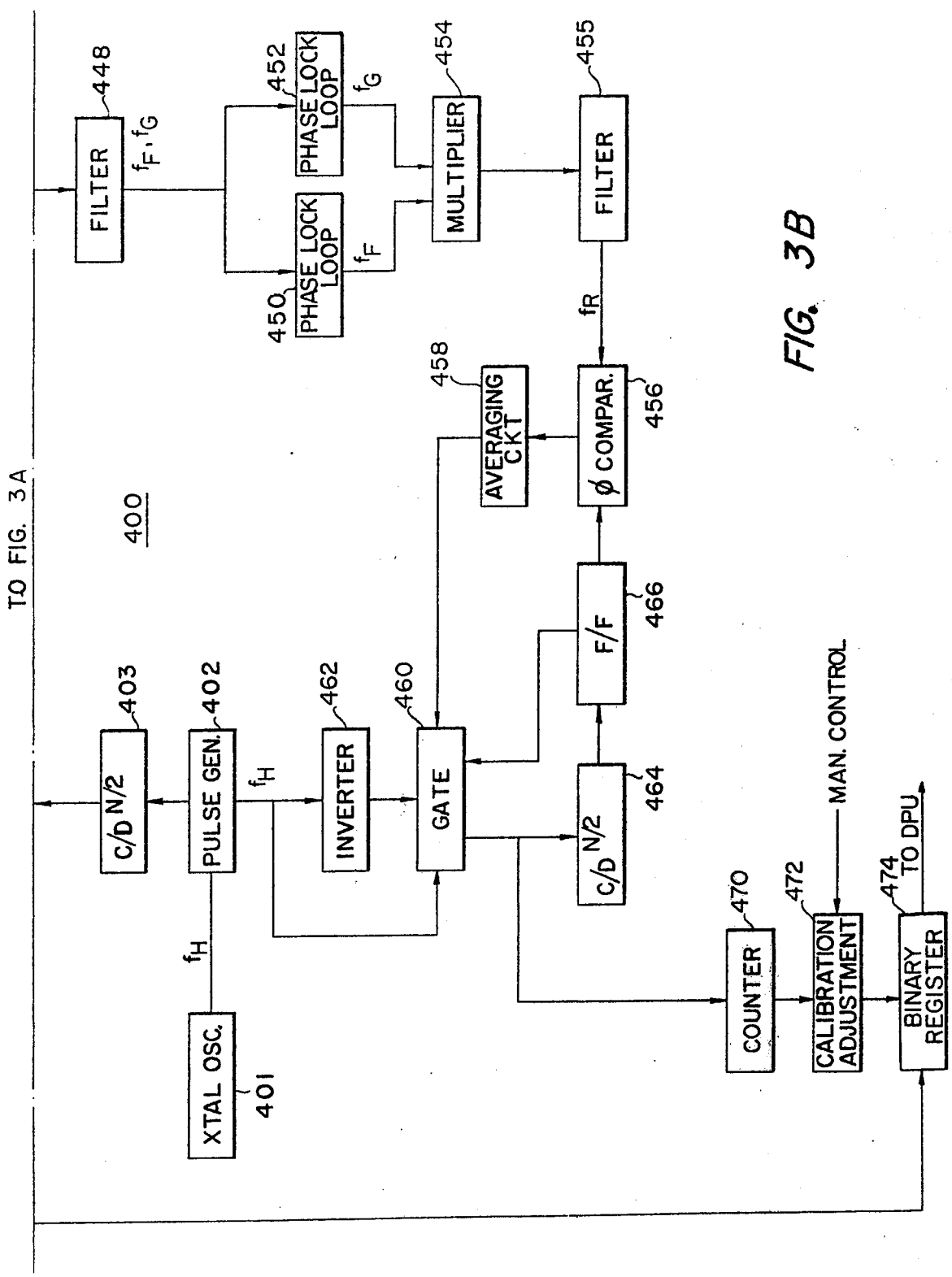

The transmitting apparatus shown in FIGS. 3A and 3B utilizes a crystal oscillator 401 with output $f_H$ ($f_H=Nf_R$) connected to a pulse generator 402 to produce pulses at $f_H$ rate. These pulses then go to a countdown circuit 403 with output of pulses $f_H/(N/2)$. These are fed to a flipflop circuit 404, producing square waves of $f_R$ frequency, which are formed into sine waves by filter 405 and input to converter 406. The output of crystal oscillator 407 frequency $f_A$ combines with $f_R$ in converter 406 ($f_B=f_A+f_R$) and is filtered at 408, which passes only frequency $f_B$.

A crystal oscillator 410 with output $f_C$ connects to converter 412, which also receives inputs $f_A$ from oscillator 407 and $f_B$ from filter 408 to produce the transmitting frequencies $f_1$ and $f_2$ ($f_1=f_C+f_A$) ($f_2=f_C+f_A+f_R$). The band pass filter 414 passes the high frequency band only slightly wider than $f_R$, i.e., $f_1$ and $f_2$, which are amplified by amplifier 416 and power amplifier 418, to be radiated by antenna 420.

The transmitted high frequency radiations $f_1$, $f_2$ are received by the transponder 422, consisting of a receiver and transmitter, at a distant point, in this case on the target 500. These signals are amplified in amplifier 424, combined in converter 425 with output $f_D$ of crystal controlled oscillator 426 and passed through filter 428 to amplifier 430. After amplification in linear amplifier 432, the high frequency signals $f_3$, $f_4$ ($f_3=f_1+f_D$, $f_4=f_2+f_D$) are transmitted by antenna 434 as continuous wave radiations differing by low frequency $f_R$.

The radiations $f_3$, $f_4$ from the transponder are received by antenna 440 of the receiver, in this case associated with the transmitter, and after amplification in amplifier 442, combine with output $f_E$ of crystal controlled oscillator 444 in converter 446 and pass through filter 448 as frequencies $f_F$ and $f_G$, differing by frequency $f_R$. The phase-lock loop circuits 450, 452 each respond to one of the frequencies $f_F$ and $f_G$, which are then combined in multiplier circuit 454 to form the difference frequency $f_R$, the filter 455 passing only $f_R$.

This $f_R$, the difference frequency of the transmissions from the first point to the second point and return, has been displaced in phase in proportion to this distance. This $f_R$ is now compared with the difference frequency $f_R$ from $f_1,f_2$ in the transmitters in the phase comparison circuit 456.

These latter $f_R$ pulses are derived from pulses produced by the pulse generator 402, at the $f_H$ rate, which pass to gate 460 directly, and also to the gate through inverter 462. This gate may pass the pulses at $f_H$ rate to the countdown circuit 464, where the output from the gate is divided by N/2 to give pulses to the flipflop circuit 466 which has a square wave output at the $f_R$ rate and fed to phase comparison circuit 456.

The square wave from the flipflop 466 at the $f_R$ rate, derived from the source frequency, is input to the phase comparison circuit 456 with the sine wave signal $f_R$ which is the "round trip" signal from the distant point. The output of the phase comparison circuit 456 and its averaging circuit 458 varies in amplitude and polarity according to the phase difference between the two signals, and is positive or negative when the phase of one signal is ahead or behind the phase of the other. This voltage is fed to the gate circuit 460, which receives positive pulses at the $f_H$ rate directly from pulse generator 402 and also from the inverter 462, the negative pulses from the pulse generator producing the positive pulses from the inverter intermediate in time with respect to the direct pulses.

With no voltage to the gate 460 from the phase comparison and averaging circuits, the gate passes positive pulses at the $f_H$ rate to the countdown circuit 464. A no-voltage condition for the phase comparison circuit occurs when no phase difference exists between the input signals.

A positive voltage from the phase comparison circuit 456 to the gate circuit 460 will cause additional pulses to be supplied to the countdown circuit from the inverter 462, thereby advancing the square wave in time and therefore its phase. These additional pulses from gate 460 will cause the counter 470 to "step ahead." When the voltage from the phase comparison and averaging circuits is negative, the gate will stop or negate the pulses arriving at the gate directly from the pulse generator and the countdown action will be retarded as long as the negative voltage exists. The stability of the circuit is assured by inputting a signal from the flipflop 466 to the gate 460, so that only one pulse can be added or negated in one $f_R$ cycle.

In operation a difference in phase of the two signals results in an output of the phase comparison circuit which causes a shift in the square wave so as to achieve alignment of the phase of the square wave with that of the round trip signal. As the phase of the round trip signal received varies due to change in distance of a moving point, the circuit responds to follow the change.

To obtain the range data in digital form for the data processor, the pulses from the gate to the countdown circuit are also inputted to the binary counter 470 of N stages. This counter will therefore by cycled through a full count for each cycle of the range measurement frequency. The output of the binary counter then passes through calibration adjustment circuit component 472 to a binary register 474. The leading edge of the $f_R$ square wave at the output of flipflop unit 404 initiates the transfer of the contents of Binary Register 474, which at that moment will be a binary equivalent of the measured range, to the DPU.

The calibration adjustment component 472 provides for a calibrated range setting for the system. The setting is required since the phase of the range measuring frequency in its round trip is affected by the components of the system and the several circuits, including wiring and cables. Once the system is constructed and installed, these phase shifts are fixed.

The calibration adjustment component 472 may be set by comparing with a known distance of the aircraft on which the system is installed and the ground unit, then manually setting the calibration adjustment control to give a range data reading of the known distance. This setting may be made at the airport with the aircraft unit on the ground a measured distance from the ground unit. This procedure should be followed when any changes take place in the aircraft or in the installation of the unit.

For day-to-day operations, the ground unit may be checked using an aircraft unit at a known distance to ascertain if the system is providing correct data. As this unit may differ in its phase shift characteristics from the one installed on the aircraft, an initial measure of this difference must be obtained by comparing the setting for the test unit and for the aircraft installation.

This range measurement system is unusually stable, since it is less subject to external conditions than many other types of systems. A major influence on circuit phase constancy is the temperature of circuit elements as, for example, capacitors which may change in value with temperature, and consequently the characteristics of a circuit and its phase effect. The present system obviates or reduces temperature effects sufficiently that ordinary circuit design and construction techniques may be employed. This effect is the result of using two closely spaced signals, as $f_1$ and $f_2$, or $f_3$ and $f_4$, which pass through the same circuit elements and circuits. External conditions, such as temperature change, will affect both signals to substantially the same extent, so that the relative phase differences of the two signals will be substantially constant.

Operation of this system with the narrow band necessary in the very high frequency range results in economies of standard circuitry and low power. Interference in this range, as well as noise effects, are less of a problem, and allocations are more likely to be available. The problems and circuitry inherent in modulating the carrier frequencies are also avoided.

This distance measurement system will have a usable range comparable to the wavelength corresponding to the difference frequency $f_R$. For example, the difference or range measuring frequency of 7.5 KHZ gives an unambiguous measurement of range up to 18 kilometers. This range is satisfactory for the purposes of the Weapon Aim Evaluation System. The range measurement accuracy is a function of an incremental unit of the wavelength of frequency $f_R$, however, if a greater accuracy is required, a venier effect may be provided by the phase measurement of one of the high frequencies $f_1$ or $f_2$, with a correspondingly more sophisticated circuitry for producing a fine, unambiguous measurement at the higher frequency.

The two transmitted continuous wave radiations in this system are transmitted as two separate signals. The same effect could be produced by other means, for example, by two side bands of a single carrier, spaced by the difference frequency $f_R$ (7.5 KHZ in the example), and the carrier frequency could be eliminated at the transmitter.

I claim:

1. The method of registering the instantaneous position of an object at a distance from a given point comprising transmitting electromagnetic radiation from a position fixed relative to said given point to said target and inducing returned electromagnetic radiation from said target, receiving said returned radiation at a position fixed relative to said given point, and measuring the distance of said object by measuring the effect of the distance traversed on said transmitted and received radiations, and registering said distance, and determining the direction of said object in a fixed reference system at a given point by directing a television camera toward said object at a position fixed relative to said given point, registering the direction of aim of said television camera, measuring vertical and horizontal coordinates of the position of the image of said object on the sensitive surface of said television camera relative to the axis of said television camera, and determining the direction of said object from the direction of aim of said television camera and the position of the image of said object on said sensitive surface, so that the location of said object at any instant is determined by the distance measured and the direction of the object from the given point.

2. The method of registering the instantaneous position of an object at a distance, in which a light radiating source and a high frequency radio transmitting apparatus are mounted on said object, comprising receiving said light radiation at a spot on the sensitive surface of a television camera at a fixed point, registering the direction of aim of the television camera and vertical and horizontal coordinates relative to the line of aim of the spot on the screen receiving said light radiation to register the direction of said object, transmitting two spaced radio frequency radiations to said object from a fixed point, which differ by a frequency corresponding to a wavelength not exceeding the distance between said object and said fixed point, and actuating the transmitting apparatus on said object to return two radio frequency radiations which differ by the same frequency as the radiations transmitted from the fixed point to receiving apparatus at a fixed point, comparing the difference frequencies of said transmitted and received radiations to measure the distance of said object, and registering the direction and distance of said object from a given point related to said fixed points.

3. The method claimed in claim 2, in which the line of aim and position of said camera are registered in a data processing unit (DPU), and coordinates of the light image on the sensitive surface are continuously measured electronically and registered in said DPU, the distance measured by comparing said transmitted and received radiations being continuously registered in said DPU, said DPU continuously registering the instantaneous direction and distance of said object from a given point.

4. A system of locating the instantaneous position of an object at a distance from a given point comprising a television camera, distance measuring means and a computing and registering means connected to said television camera and said distance measuring means, said system including means for registering the position of said television camera, means to register the coordinates of the position of the image of said object on the sensitive surface of said television camera, said distance measuring system comprising a transmitter for transmitting electromagnetic radiation to said object to induce return radiation from said object, a receiver receiving said return radiation and including means to compare said return radiation with the transmitted radiation to measure the distance of said object, means to register the positions of said transmitter and receiver relative to said given point, and means to register the distance measurements of said object, said computing and registering means continuously registering the instantanous position of said object relative to said given point.

5. A system as claimed in claim 4, in which said computing and registering means includes a data processing unit (DPU) which has the constants of a firing weapon stored therein, and said DPU calculates the correct aim of said weapon directed at said object at the time of registering the position of said object.

6. A system for registering the instantaneous position of an object at a distance, comprising a light radiating source and a high frequency radio transmitting apparatus mounted on said object, said transmitting apparatus transmitting two spaced, high frequency radiations, a television camera at a fixed point receiving light from said light source on its sensitive surface, a radio transmitting apparatus for transmitting two spaced, high frequency radio radiations to said object, said object carrying a transducer to receive the high frequency radiation from a fixed point and to actuate said transmitter on said object to transmit two spaced, high frequency radiations, said spaced, high frequency radiations transmitted from said object differing in frequency from said radiations received, the two spaced frequencies transmitted from the fixed point and those transmitted from the object having the same difference in frequency which corresponds to a wavelength not exceeding the distance between the fixed point at which said transmitting apparatus is located and the object, a receiving apparatus at a fixed point to receive the high frequency radiations from said object, means to compare the radiations transmitted and received at said fixed points to measure the distance to said object, means to measure the coordinates of the position of the light image on said surface of said television camera and the direction of aim of said camera and means to register the distance and direction of said object from a fixed point, so that the position of said object may be determined from its direction and distance from a fixed point.

7. A system as claimed in claim 6, in which a data processing unit (DPU) is connected to said radio transmitting and receiving apparatus and said television camera at fixed points to register the direction of aim of the camera, said system including means to measure continuously the position of said light image on said surface and register said position in said DPU, said DPU registering the instantaneous direction and distance of said object from a fixed point.

8. The method of measuring the distance of a second point from a first point comprising, transmitting from a transmitter at said first point two high frequency wave radiations differing by a low frequency which has a wavelength at least as great as the distance from the first point to the second point and return, initiating by said two radiations at said second point the return transmission of two high frequency wave radiations which differ by the same low frequency as said first two radiations, receiving by a receiver fixed relatively to said first point said return radiations, deriving the difference frequencies of the transmitted and received radiations, and measuring the phase displacement of the difference frequency of the received radiations relative to that of the transmitted radiations to determine the distance traveled from the first point to the second point and to the receiver.

9. The method of measuring the distance of a second point from a first point comprising, transmitting from a transmitter at said first point two high frequency continuous wave radiations differing by a low frequency which has a wavelength at least as great as the distance from said first point to said second point and return, initiating by said two radiations at said second point the transmission of two different high frequency continuous wave return radiations which differ by the same low frequency as said first two radiations, receiving at said first point said two different radiations, deriving the difference frequencies of the transmitted and received radiations, and measuring the phase displacement of the difference frequency of the received radiations relative to that of the transmitted radiations, and registering the distance between said points as determined by said phase displacement.

10. A system for measuring the distance between two points, comprising a transmitter at the first point for transmitting two high frequency wave radiations differing by a low frequency having a wavelength at least as long as the total distance to and from the second point, a transmitter at the second point actuated in response to reception of transmission from the first transmitter for the return transmission of two high frequency wave radiations differing by said same low frequency, a receiver for the return radiations, and means for comparing the difference frequencies of the transmitted and received radiations to measure the phase displacement of said received radiations and measure the distance traversed to and from said object.

11. A system as claimed in claim 10, in which the two continuous wave high frequency radiations of the return transmission differ from the continuous wave high frequency radiations transmitted at the first point.

12. A system as claimed in claim 11, in which said receiver for the return radiations is at said first point.

13. The method of determining the direction of an object, comprising aiming a television camera at the object so that the image of the object is positioned on the image surface of the television camera, measuring the elevation angle and the azimuth angle of the line-of-sight of the television camera and transmitting the data of these angle measurements to an electronic data processing unit, scanning said image surface in operation of the camera and electronically counting the lines of the scanning trace to the object image on the image surface to provide data of one coordinate of said object image on the image surface and transmitting the data of the count of the lines to said electronic unit, measuring the length of said lines of said trace to the object image by the number of unit pulses to provide data on the length of the line and the other coordinate of said object image on the image surface, transmitting the data of said coordinates to said data processing unit, and deriving from the data for said line-of-sight of said camera and from said coordinates of said object image on said image surface, the true direction of said object from the camera position.

14. The method as claimed in claim 13, in which said object is a light source, and the electronic counting of the number of lines and of the length of lines is activated by the intensity of the object image and the effect of said image on the scanning trace.

15. A system for measuring the elevation angle and azimuth angle of the line-of-sight of a distance object from a television camera, comprising angle measuring units connected to said camera to measure the elevation angle and the azimuth angle of the line-of-sight of the television camera, an electronic circuit connected to the video scanning trace of the camera which counts the number of lines of the trace in each scan of the image surface and the length of each line by the frequency pulses from the start of the line, a peak reader circuit in said electronic circuit which controls the counting of the number of lines to an object image on said image surface having a maximum intensity relative to other images, and also the counting of pulses to give the length of lines intersecting said object image of maximum intensity, said electronic circuit registering the number of lines and the length of said lines to said object image to measure the coordinates of said object image on said surface, and a data processing unit connected to said angle measuring units and said electronic circuit to receive data from said units and circuit and derive from said data the line-of-sight of said object from said camera position.

* * * * *